R. FORWARD.
FENDER FOR MOTOR CARS.
APPLICATION FILED APR. 3, 1909.
952,243.
Patented Mar. 15, 1910.
2 SHEETS—SHEET 1.
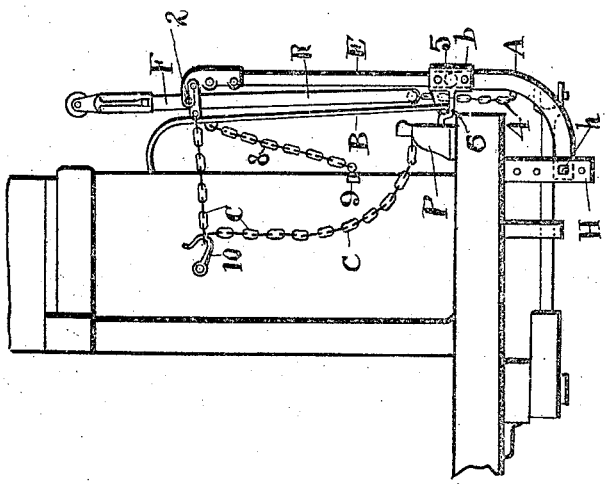
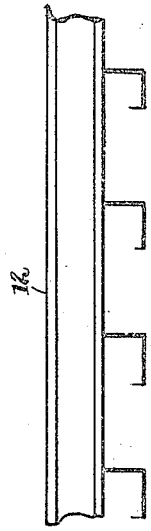
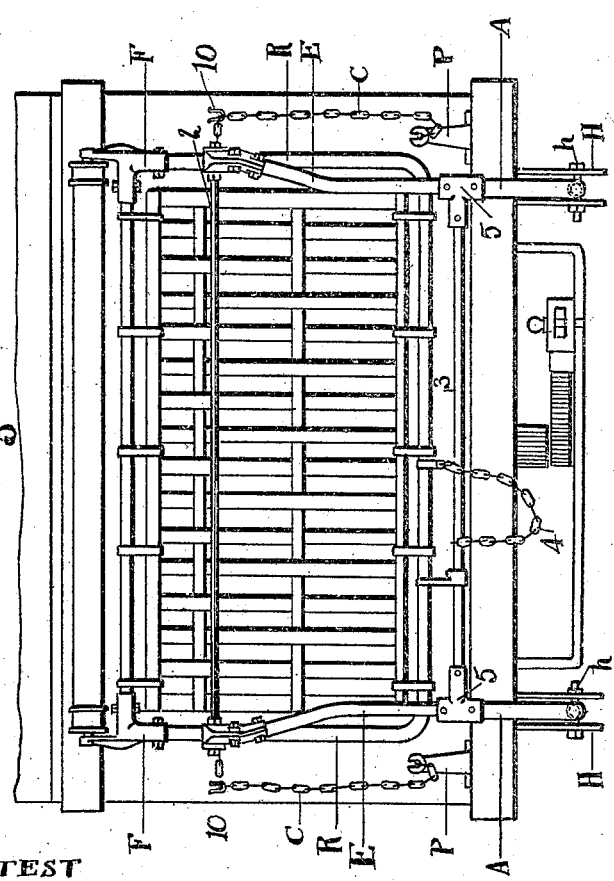
ATTEST
E. M. Fisher
J. C. Musson
INVENTOR
Ross Forward
BY Fisher & Moser ATTYS.

R. FORWARD.
FENDER FOR MOTOR CARS.
APPLICATION FILED APR. 3, 1909.
952,243.
Patented Mar. 15, 1910.
2 SHEETS—SHEET 2.
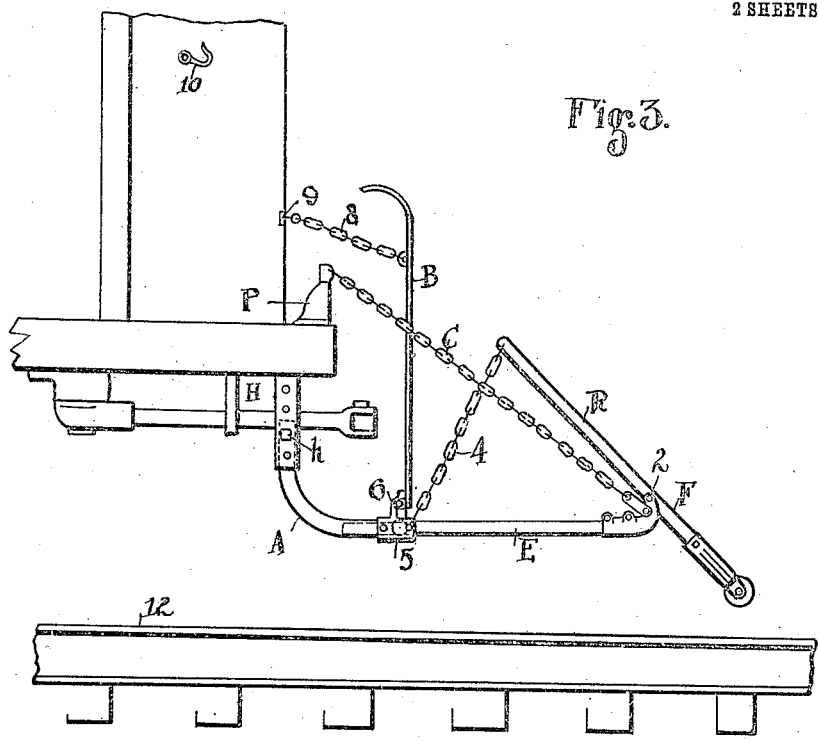
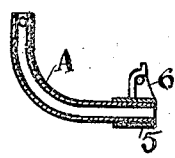
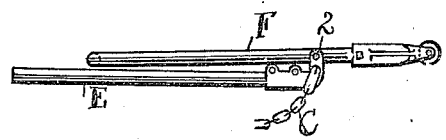
ATTEST
E. M. Fisher
J. C. Mussun
INVENTOR
Ross Forward
By Fisher & Moore ATTYS.

UNITED STATES PATENT OFFICE.

ROSS FORWARD, OF CLEVELAND, OHIO.

FENDER FOR MOTOR-CARS.

952,243.  Specification of Letters Patent.  Patented Mar. 15, 1910.

Application filed April 3, 1909.  Serial No. 487,653.

*To all whom it may concern:*

Be it known that I, ROSS FORWARD, citizen of the United States, residing at Cleveland, in the county of Cuyahoga and State of Ohio, have invented certain new and useful Improvements in Fenders for Motor-Cars, of which the following is a specification.

My invention relates to fenders for motor cars, and the invention consists in the construction and combination of parts substantially as shown and described and particularly pointed out in the claims.

In the accompanying drawings, Figure 1 is a front elevation of a portion of a car body with the fender in raised and folded position against said front, and Fig. 2 is a side elevation of the car body and edge elevation of the fender as it appears in Fig. 1. Fig. 3 is a side elevation of the portion of the car body shown in Figs. 1 and 2 and the fender down in working position, and Figs. 4 and 5 are elevations of details, as hereinafter fully described.

One of the objects of this invention is to provide a fender which is adapted to be folded entirely out of the way against the end of the car when the car is used as a trailer or for other reason when such folding becomes desirable.

To this end and to improve the construction of the fender in other particulars as will hereinafter fully appear, I support the entire fender or fender structure as a whole from the front of the car on a frame comprising arms A, which are supported upon suitable hangers H from the body of the car and upon which hangers the said arms are vertically adjustable according to the working elevation desired. Said arms A are curved to elbow or substantially a right angled shape so as to bring their extremities at substantially right angles to each other, and this construction of said arms is important to permit or promote the folding of the fender up against the front of the car body out of the way and so as to leave the space beneath entirely open for convenience of coupling with the car at the front. The said arms A are, therefore, free to swing upon their pivot bolts *h* in the hangers H and are tubular at their front portions to receive the side members or bars E in sliding or sleeving relation and which are adapted to project therein to the bends of said elbows, which form the limit of their inward movement. Otherwise the said side parts E are free in said arms. That is, they are not necessarily secured by set screws or otherwise and are supported at their front ends by chains C extending therefrom to the open slotted posts P upon the front of the car body and in which said chains are adjustable and removable as is now well known in what are known as the Lev fenders and upon which this fender is an improvement. The said side bars or tubes E are connected at their outer ends by a rod 2, and the extremities of the arms A are connected by a cross rod 3. This construction practically makes a frame of the parts A and E with the cross rods 2 and 3, and so far as operation is concerned they are the same substantially as if the said frames were formed integrally or rigidly in one piece. Couplings 5 of T shape support rod 3 on arms A.

Now, the carrier or pick-up member indicated by F is pivoted at its sides near its middle within or upon the front raised portions or extensions of the side rods E and is adapted to tilt upon said support, as also is well known at this time and appears in one form or another in different patents issued to Benjamin Lev, as inventor. Said carrier is designed to carry bodies picked up by the fender, and is adjustable as to inclination and held in working position by a chain or chains 4 which connect the rear of the said carrier F with the supporting frame therefor.

The buffer B is of frame shape in outline with something of a basket spring effect and is pivoted upon the fender carrying frame A, E, rather than upon or from the body of the car as shown in the Lev patents, so that it not only occupies a more advantageous position for protecting a body or person who may be thrown against it over or upon the fender carrier F, but also enables the buffer to be folded up compactly with the fender as a whole and occupy the least possible space on the car, relatively, as seen in Fig. 2. The coupling or sleeve 5 is fixed upon the extremity of each arm A and said coupling has a projection 6 on top upon which buffer B is pivotally supported, but in such relation and way that it will be held erect and in buffing position and so that it cannot swing behind this position though it may fold forward over the carrier upon the main fender frame. To this end the pivots for the buffer in posts 6 are on a plane below the top of the post and the buffer rests back against the upper positions of these posts when in a vertical position and beyond which it cannot go except as it springs backwardly more or less in its woven body when an object is thrown against it, as occurs when a person is picked up by the fender and thrown more or less violently against the buffer. In that case the buffer will yield sufficiently to prevent injury to the person and yet be strong enough to hold its position and prevent contact with the car body or frame behind. Chains 8 connect the buffer with catches 9 on the sides of the car and hold it in erect position. It will be noticed in this connection that the buffer is not only pivoted at the outer extremities of the curved arms A of the main frame, but is adapted to be raised up bodily with said frame from its working position as seen in Fig. 3, where it is well to the front and relatively below the bottom of the car body, to a folding position with said frame above the bottom of the car and in substantially flat position against the fender F and frame R.

For folding purposes the sides of the car body are provided with hooks 10 which are engaged by the chain C through any one of the links therein adapted to make a short and supporting connection with said hooks. Otherwise all the parts sustain their usual connection with each other, so that when it becomes necessary to get a fender out of the way for any reason, whether for trailing or for storing the cars in the barns or the like, it is only necessary to swing the fender as a whole bodily on its pivots into a vertical position against the front of the car body as seen in Fig. 2, and then hook up the chain C as short as possible and the work is done. So likewise when the fender is to be lowered it is simply necessary to release chain C from the hooks 10 and let it down to working position and it is ready for service. In connection with Figs. 1, 2 and 3 I show sections of a track with rails 12 which serve to illustrate relative positions of parts on the car. Finally it is to be observed that side bars E depend exclusively upon chains C for holding them in their sockets in elbows A, and that when said chains are released from posts P the said bars and entire fender can be withdrawn and removed without detaching or releasing any other part.

What I claim is:

1. In car fenders, a fender mechanism comprising a carrying frame having integral upward extensions at its rear and side at substantially right angles to the body of the frame and constructed to be pivotally supported and folded vertically at the front of the car, and hangers on the bottom of the car body on which said frame is pivoted, in combination with a tilting carrier mounted in the front of said frame.

2. In car fenders, a fender comprising elbow shaped supporting members at its rear and sides and a frame body slidably engaged with said members at its rear ends, and separate means engaging said supporting members and said body respectively and adapted to support the same in working position.

3. A fender carrying frame consisting of substantially right angled supporting members adapted to be pivoted at one end to sustain pivotal relation to the car body and side members of said frame in slidable engagement with said supporting members and cross connections between said parts from side to side, thereby producing a substantially rigid frame, in combination with a carrier pivoted between the front ends of said frame and separate means to hold both said fender and said frame in working positions.

4. In car fenders, a fender frame having elbow shaped rear side portions and hangers pivotally supporting the same from a car, in combination with a carrying frame separately engaged at its sides with said elbow shaped rear side portions, a buffer pivotally supported at its bottom substantially at the front ends of the said side portions of the fender frame, and means to engage said fender with the car and hold it in a vertical position.

5. The fender frame consisting of front and rear parts separably connected and means to support the same on a car, in combination with a carrier pivoted on the front of said frame and adapted to fold thereon, and a buffer pivoted at its bottom and sides on the rear of said frame and adapted to fold forward upon said carrier, said buffer and fender being supported in substantially the same horizontal plane.

6. A fender attachment for cars comprising a fender frame having side and rear portions bent upwardly at their rear ends and straight front portions telescopically engaged therewith, in combination with a buffer and posts rigid with said fender frame on which said buffer is pivoted, said posts being constructed to prevent said buffer from swinging behind a substantially vertical position on its pivots.

7. The combination of a fender frame consisting of front and rear parts slidably united, a buffer pivoted at its bottom on the said rear part of the fender frame and adapted to fold over the front part thereof, in combination with a carrier pivoted between the front ends of the said front part of said frame and adapted to fold beneath said buffer.

8. A fender frame comprising a rear part and a front part telescopically and separably united at their ends, and means to suspend said parts from the front of a car comprising hangers for the rear part and a cable for the front part.

In testimony whereof I affix my signature in presence of two witnesses.

ROSS FORWARD.

Witnesses:
E. M. FISHER,
F. C. MUSSUN.